Aug. 11, 1959 W. HOWELL 2,898,672
TITANIUM PRESS SCRAP RECOVERY AND ELECTRODE MANUFACTURE
Filed Aug. 19, 1955 2 Sheets-Sheet 1
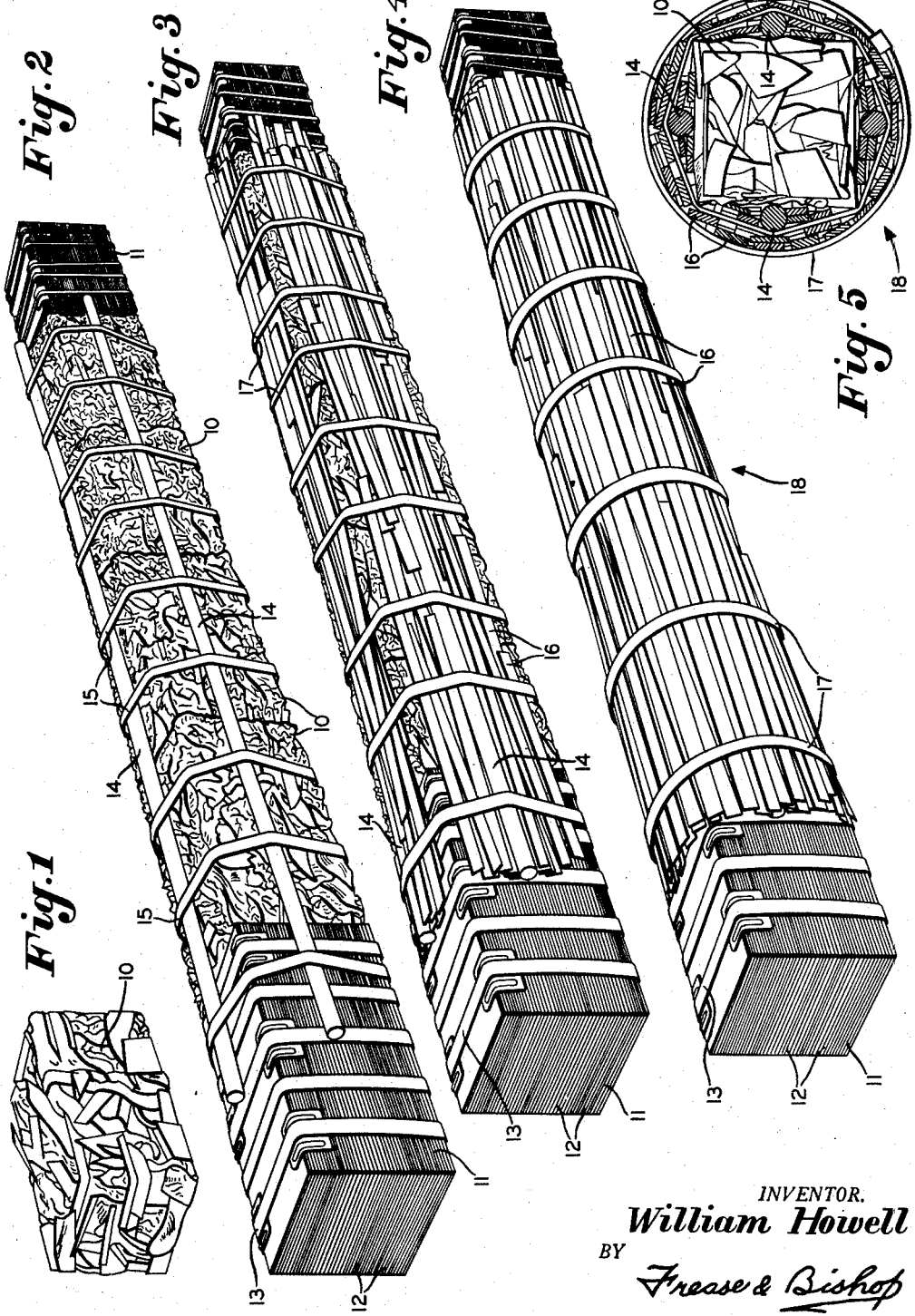
INVENTOR.
William Howell
BY
Frease & Bishop
ATTORNEYS

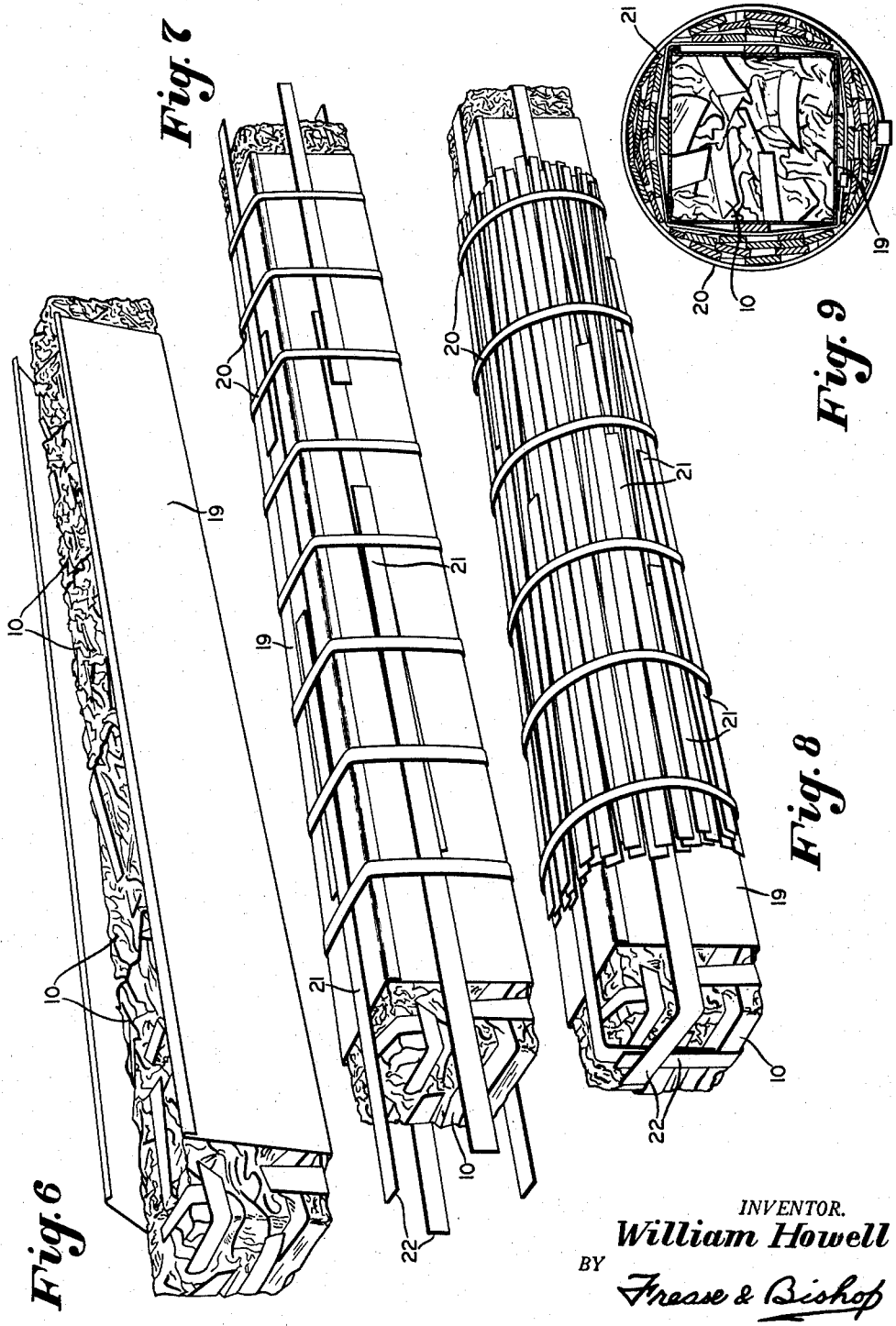

United States Patent Office 2,898,672
Patented Aug. 11, 1959

2,898,672

TITANIUM PRESS SCRAP RECOVERY AND ELECTRODE MANUFACTURE

William Howell, Warren, Ohio, assignor to Mallory-Sharon Metals Corporation, a corporation of Delaware Application August 19, 1955, Serial No. 529,494

5 Claims. (Cl. 29—184)

The invention relates to consumable titanium electrodes for use in the production of titanium ingots, and more particularly to such an electrode made of titanium press scrap, and to a method of making the same.

In the operation of presses for forming articles from titanium sheets, a considerable amount of titanium press scrap results. Since titanium is a valuable metal, this titanium scrap has a very substantial value, and for economic reasons it is important that the same be utilized to the best possible advantage.

However, because of the characteristics of titanium, it is not possible to use titanium scrap in the usual manner in which other metal scrap is ordinarily used.

While methods have been developed for using certain types of scrap titanium in sponge, bar end and chip form, and even to some extent, relatively large, substantially regularly shaped pieces of sheet or plate scrap, there has not been any practical method of recovering such irregularly shaped titanium sheet scrap material as press scrap.

It is therefore a primary object of the invention to provide a practical, efficient and economical method of recovering titanium press scrap in the production of titanium ingots.

Another object is to provide for the manufacture of consumable titanium electrodes from titanium press scrap.

A further object is to provide a consumable titanium electrode formed almost wholly from titanium press scrap, for use in an electric arc furnace for the production of titanium ingots.

A still further object is to provide a titanium electrode formed of a plurality of bales of titanium press scrap secured together end to end.

Another object of the invention is to provide such a titanium electrode in which the bales of titanium press scrap are located end to end and secured to bars of titanium by means of binding straps of strip titanium.

It is also an object of the invention to provide for the manufacture of such an electrode in which the core of baled titanium press scrap is surrounded by layers of titanium sheet scrap shearings of various lengths and widths, bound upon the core by titanium straps.

A further object of the invention is to provide an alternative method of forming a consumable titanium electrode by forming bales of titanium press shop scrap of miscellaneous sizes, placing the bales end to end in a can or envelope of titanium sheet material and binding the bales therein with titanium strips, and binding longer pieces of titanium press scrap or titanium sheet shearings around the can.

The above and other objects and advantages which may be hereinafter pointed out, or which will be apparent to those skilled in the art, may be attained by the parts, constructions, arrangements, combinations, methods, steps, operations and procedures comprising the present invention, the nature of which is set forth in the following general statement, preferred structural and procedural embodiments of which, illustrative of the best modes in which applicant contemplates applying the principles, are illustrated in the accompanying drawings and described in detail in the following description, and which are particularly and distinctly set forth and pointed out in the appended claims forming part hereof.

The nature of the present invention may be stated in general terms as including the provision of a consumable titanium electrode for the production of titanium ingots by using titanium press shop scrap of miscellaneous sizes and shapes, wherein such titanium press scrap is pressed into small bales.

A plurality of these bales are placed end to end, with solid titanium end members secured to opposite ends thereof, as by binding titanium rods to one or more sides of the assembly by titanium straps.

Elongated strips of titanium press scrap, or other titanium sheet shearings, are placed circumferentially around the core thus formed, the ends of such strips overlapping, and are bound circumferentially around the core by titanium straps at spaced intervals, to hold the assembly together as a bundle, the titanium press scrap, titanium rods, solid titanium end members and the titanium binding straps having substantially the same or desired analyses.

The invention also includes the provision of a consumable titanium electrode for the production of titanium ingots in a consumable electrode, electric arc furnace, which includes an assembly of baled titanium press scrap forming a core, and a plurality of elongated titanium rods and pieces of titanium sheet scrap disposed around the core and secured thereto by a plurality of titanium binding straps circumferentially binding the elongated scrap material to the core at spaced intervals, the core, the rods, the elongated scrap pieces and the binding straps having the desired analysis.

The invention also includes an alternative embodiment in which bales of titanium press scrap are placed end to end within a can or envelope formed of titanium sheet material, and bound therein by titanium straps, and elongated pieces of titanium sheet scrap such as press scrap, sheet shearings or the like are bound circumferentially around the can or envelope by titanium straps, and this embodiment includes this alternative form of electrode and the method of making the same.

Referring now to the accompanying drawings which are illustrative of preferred embodiments of the invention and in which similar numerals designate similar parts throughout the several views:

Fig. 1 is a perspective view of a bale of titanium press scrap material formed by pressing titanium press shop scrap of miscellaneous sizes and shapes into a compact mass of desired cross-sectional shape;

Fig. 2 is a perspective view of a core formed of a plurality of bales of titanium press scrap, located end to end with solid titanium members at each end, and secured together by elongated rods of titanium bound around the assembly by titanium straps;

Fig. 3 is a perspective view of a partially completed consumable titanium electrode with elongated pieces of titanium sheet scrap bound circumferentially around a portion of the core shown in Fig. 2;

Fig. 4 is a perspective view of a completed consumable titanium electrode embodying the invention;

Fig. 5 is a transverse sectional view through the electrode shown in Fig. 4;

Fig. 6 is a perspective view showing the first step of forming an alternative form of consumable titanium electrode formed of titanium press scrap, showing a plurality of bales of titanium press scrap located end to end within a can or envelope formed of titanium sheet material;

Fig. 7 is a perspective view of the partly completed alternate form of electrode, showing the can or envelope of Fig. 6 with elongated pieces of titanium scrap bound circumferentially thereto;

Fig. 8 is a perspective view of the completed alternate form of electrode, showing elongated pieces of titanium scrap banded circumferentially around the core shown in Fig. 7; and, Fig. 9 is a transverse sectional view through the consumable titanium electrode shown in Fig. 8.

Referring now more particularly to the embodiment of the invention illustrated in Figs. 1 to 5 inclusive, in the formation of the consumable titanium electrode, the first step is the production of small bales of titanium press shop scrap of miscellaneous sizes and shapes, produced by compactly pressing the titanium press scrap into desired shape.

The bales formed in this manner may be of rectangular cross-section, as indicated at 10, or may be of other cross-sectional shape as desired. A plurality of these bales of titanium press scrap are then placed end to end, with solid titanium members as indicated at 11, located at each end thereof.

These solid end members may be of any suitable construction, and as shown in the drawings each end member may be composed of a plurality of rectangular pieces of titanium sheet or plate material 12 secured tightly together in any suitable manner as by titanium binding straps 13.

Elongated titanium rods 14 are located longitudinally along one or more sides of the end to end assembly of bales and solid end members, and are secured thereto by titanium binding straps 15, as shown in Fig. 2, forming a core for the electrode.

The next step in the formation of the electrode is shown in Fig. 3, in which elongated pieces of titanium sheet scrap, such as sheet shearings or the like indicated at 16, are bound circumferentially to the sides of the core as by titanium straps 17.

This process is continued around all sides of the core, producing the completed electrode as shown in Figs. 4 and 5, comprising a core of baled titanium press scrap with solid end members secured together by titanium rods bound thereto and elongated pieces of titanium sheet scrap bound circumferentially therearound by titanium straps.

At least one of the solid end members 11 may be left uncovered at one end of the electrode thus formed, as shown in Fig. 4, to provide a means by which the electrode may be secured by conventional clamping means for suspending the electrode in a furnace as a consumable electrode.

Electrodes constructed in this manner can be used in the production of titanium ingots. For this purpose the diameter of the electrode, indicated generally at 18 in Figs. 4 and 5, after being built up by the scrap pieces 16, should be slightly less than the inner dimension of the mold, and the cross-section of the electrode is substantially uniform throughout its length so that the sides of the electrode will not contact the inner sides of the mold at any point during the melting operation.

By the above described construction of electrode and method of making the same, it will be seen that the electrode is formed largely of titanium press scrap which is not reclaimable under present practice. Thus considerable amounts of titanium press scrap, which is otherwise unusable, may be recovered for the production of titanium ingots by forming it into consumable titanium electrodes.

Referring now to the alternate embodiment of the invention illustrated in Figs. 6 to 9, the core of the electrode may be formed by placing bales 10 of titanium press scrap end to end within an elongated one-piece, longitudinally slit can or envelope 19, formed of titanium sheet material and of the cross-sectional size and shape of the bales 10, as shown in Fig. 6.

The can or envelope 19 is then bound tightly around the assembly of bales of titanium press scrap, by titanium straps 20, as shown in Fig. 7, and in this step of the method a few elongated pieces of titanium sheet scrap, as indicated at 21, may be bound against the outside of the can or envelope.

The ends of some of the straps 21 may extend beyond the end of the can, as indicated at 22. These extended ends 22 are then bent over the end of the endmost bale 10, as shown in Fig. 8, and additional elongated pieces of titanium sheet scrap are assembled longitudinally around all sides of the envelope and substantially coextensive therewith and are bound circumferentially entirely around the core, as by additional titanium straps 20, producing the completed electrode as shown in Figs. 8 and 9.

One end of the can 19 is left exposed to provide means by which the electrode may be secured by conventional clamping means for suspending it in a furnace as a consumable electrode.

From the above it will be obvious that both embodiments of the invention provide a consumable titanium electrode construction and method of making the same which permits the salvaging of otherwise unusuable titanium press scrap for the manufacture of titanium ingots, whereby such titanium press scrap may be completely utilized.

Also, the improved constructions and methods enable the production of a consumable titanium electrode formed of a plurality of compact bales of titanium press scrap secured together, which by reason of its compressed construction has sufficient electrical conductivity to permit its use as a consumable titanium electrode in an arc furnace for the production of titanium ingots.

It should be understood that throughout the descriptive specification and claims, the terms "press scrap" and "press shop scrap" refer to the scrap material resulting from the fabrication or shaping or articles from sheet material in a forming or stamping press.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of making a consumable electrode from titanium scrap material, which consists in the steps of pressing titanium press scrap into compact bales, assembling the bales of titanium press scrap in end-to-end and metal-to-metal contact, forming solid titanium end members by arranging a plurality of longitudinally disposed elongated rectangular pieces of titanium sheet material of uniform size and shape face to face in an edge-aligned stack, binding said stack laterally with titanium straps, placing one of said solid end members at each end of the assembled bales, in end-to-end, metal-to-metal contact therewith, placing at least one titanium bar longitudinally upon the bales and both solid end members, circumferentially binding the bales and both solid end members to the bar with titanium straps forming a rigid core, assembling elongated pieces of titanium sheet scrap of various lengths and widths longitudinally about the core, said elongated pieces of titanium sheet scrap partially overlapping the solid end members, and circumferentially binding the elongated pieces of sheet scrap to the core with titanium straps for securing the entire assembly together for use as a consumable titanium electrode.

2. The method of making a consumable electrode from titanium scrap material, which consists in the steps of pressing titanium press scrap into compact bales, assembling the bales of titanium press scrap in end-to-end and metal-to-metal contact, forming solid titanium end members by arranging a plurality of longitudinally disposed elongated rectangular pieces of titanium sheet material of uniform size and shape face to face in an edge-aligned stack, binding said stack laterally with titanium straps, placing one of said solid end members at each end of the assembled bales, in end-to-end, metal-to-metal contact therewith, placing at least one titanium bar longitudinally upon the bales and both solid end members, circumferentially binding the bales and both solid end members to the bar with titanium straps forming a rigid core, assembling elongated pieces of titanium sheet scrap of various lengths and widths longitudinally about the core in an irregular manner, the pieces of sheet scrap at least partially overlapping each other and partially overlapping the solid end members, binding the pieces of sheet scrap in place on one side of the core with circumferential titanium straps, assembling other elongated pieces of titanium sheet scrap on another side of the core in the same manner, circumferentially binding the other elongated pieces in place on said other side of the core with titanium straps, and repeating the assembly and circumferential binding of more elongated pieces of titanium sheet scrap on the remaining sides of the core with titanium straps for securing the entire assembly together for use as a consumable titanium electrode.

3. A consumable titanium electrode formed from titanium scrap material, comprising a plurality of compact bales of titanium press scrap located in end-to-end and metal-to-metal contact, solid titanium end members at the outer ends of said bales, each of said end members comprising a stack of longitudinally disposed elongated rectangular pieces of titanium sheet material of uniform size and shape circumferentially bound together with titanium straps, a titanium rod substantially coextensive with said bales and both solid end members and attached thereto with circumferential titanium straps forming a rigid core, a plurality of elongated pieces of titanium sheet scrap of various lengths and widths disposed longitudinally about the bales and partially overlapping the solid end members, and titanium binding straps circumferentially binding the elongated pieces of sheet scrap to the core.

4. The method of making a consumable titanium electrode from titanium scrap material, which consists in the steps of pressing titanium press scrap into compact bales, assembling the bales of titanium press scrap in end-to-end and metal-to-metal contact within a one-piece, longitudinally slit, sheet titanium envelope, tightly binding the envelope circumferentially around the bales with titanium straps forming a rigid core, and in said last-named step binding elongated pieces of titanium sheet scrap against each side of the core with said straps, the outer ends of said elongated pieces of titanium sheet scrap extending beyond the ends of the core, binding said extended ends of the elongated pieces of sheet scrap over the ends of the endmost bales, assembling additional elongated pieces of titanium sheet scrap of various lengths and widths longitudinally around all sides of the core and substantially coextensive therewith, and circumferentially binding said additional elongated pieces of titanium sheet scrap to the core with titanium straps for securing the entire assembly together for use as a consumable titanium electrode.

5. A consumable titanium electrode formed from titanium scrap material, comprising a plurality of compact bales of titanium press scrap located in end-to-end and metal-to-metal contact, a one-piece longitudinally slit titanium sheet material envelope tightly bound around the bales with circumferential titanium straps forming a rigid core, a plurality of elongated pieces of titanium sheet scrap of various lengths and widths disposed longitudinally about the core and substantially coextensive therewith, and titanium binding straps circumferentially binding the elongated pieces of sheet scrap to the core, the outer ends of certain of said elongated pieces of titanium sheet scrap extending beyond opposite ends of the envelope and being bent over the outer ends of the endmost bales.

References Cited in the file of this patent

UNITED STATES PATENTS

| | | |
|---|---|---|
| 274,019 | Murphy | Mar. 13, 1883 |
| 316,209 | Westerman | Apr. 21, 1885 |
| 361,197 | Wheller | Apr. 12, 1887 |
| 524,294 | Baugh | Aug. 7, 1894 |
| 1,046,665 | Smith | Dec. 10, 1912 |
| 1,674,311 | Wright | June 19, 1928 |
| 1,742,111 | Weishman | Dec. 31, 1929 |
| 2,100,537 | Conway | Nov. 30, 1937 |
| 2,792,621 | Howell | May 21, 1957 |